UNITED STATES PATENT OFFICE.

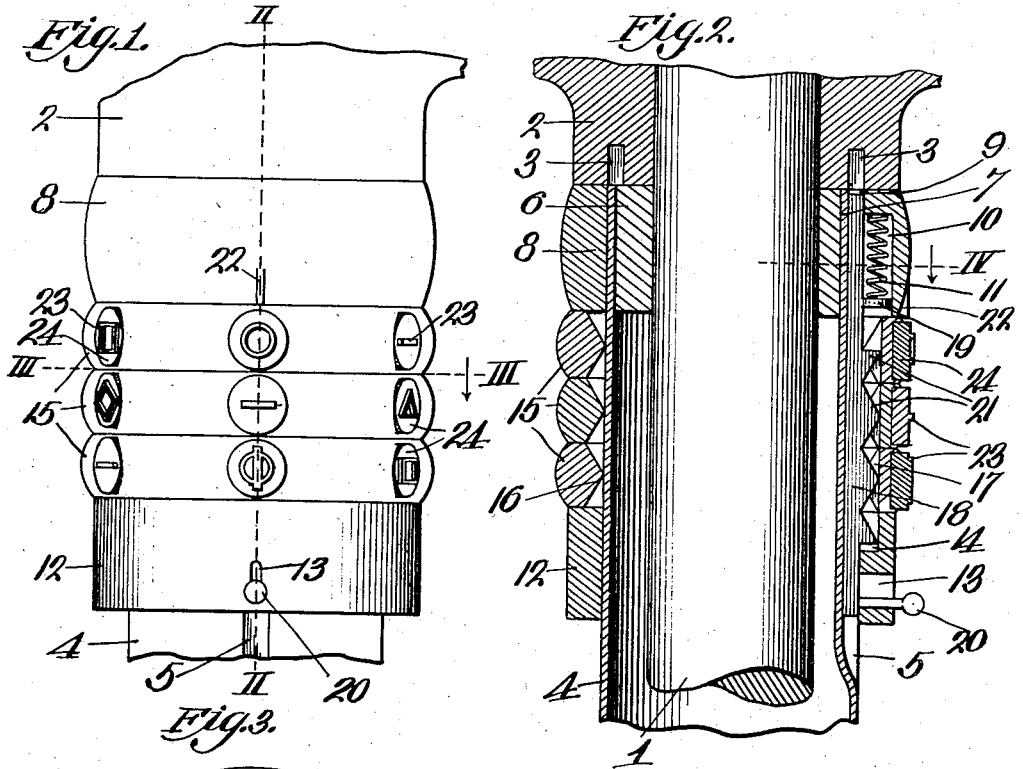

JOSEPH H. BAKER AND CHARLIE D. OBERHOLTZER, OF KANSAS CITY, MISSOURI.

STEERING-CONTROL LOCK FOR AUTOMOBILES.

1,238,247. Specification of Letters Patent. Patented Aug. 28, 1917.

Application filed March 8, 1917. Serial No. 153,501.

*To all whom it may concern:*

Be it known that we, JOSEPH H. BAKER and CHARLIE D. OBERHOLTZER, citizens of the United States, residing at Kansas City, in the county of Jackson and State of Missouri, have invented certain new and useful Improvements in Steering-Control Locks for Automobiles, of which the following is a specification.

This invention relates to steering control locks and has for its object to produce a combination lock of simple, strong, durable and inexpensive construction by which the steering wheel of an automobile can be quickly and securely locked against or released for rotation. A further object is to produce a combination lock which can be applied to any of the approved types of automobiles.

With these objects in view the invention consists in certain novel and peculiar features of construction and organization of parts as hereinafter described and claimed; and in order that it may be fully understood reference is to be had to the accompanying drawing, in which:

Figure 1, is an elevation showing a steering post control lock embodying the invention.

Fig. 2, is a section on the line II—II of Fig. 1.

Fig. 3, is a section on the line III—III of Fig. 1.

Fig. 4, is a section on the dotted line IV of Fig. 2.

Fig. 5, is a detail perspective view of the locking key of the device.

Fig. 6, is a fragmentary perspective view on one of the locking collars of the device.

In the said drawing, 1 indicates the steering post shaft, 2 a part rigid therewith and either cast with or forming a part of the hub of the steering wheel, as said part is hereinafter termed for convenience, the hub of the steering wheel. The hub is provided with a plurality of sockets 3 which open downwardly.

4 is the steering shaft tubing fitting loosely around the steering shaft and provided with a vertical keyway or groove 5 in its outer side. 6 is a spacing collar between the steering shaft 1 and the upper end of the tubing 4, and provided with a longitudinal groove 7 for the accommodation of the portion of the tubing bent inward to provide the keyway 5, and secured upon the upper end of the tubing 4 is an external collar 8 provided with a keyway passage 9 with which any of the sockets 3 is adapted to register, and with a downwardly opening socket 10 containing a spring 11.

12 is a collar secured on the tubing at a suitable distance below collar 8, provided with a vertical slot 13 and an upwardly opening socket 14, registering with the keyway 5.

Arranged side by side upon the tubing for rotation thereon and filling the space between collars 8 and 12, is a plurality of locking collars 15, the same being formed at their inner sides with annular V-shaped teeth 16 provided with cross channels 17.

18 is a slidable key fitting in the keyway 5 and keyway passage 9 and provided with an outwardly projecting lug 19 upon which the spring 11 exerts downward pressure to effect the unlocking action of the key, when unopposed. The key is provided at its lower end with a handle 20 projecting through the slot 13, so that when the locking collars are properly arranged as hereinafter explained, manual pressure can be applied for advancing the key to locked position, that is with its upper end projected into one of the sockets 3 of the steering wheel hub.

The key is provided with a plurality of angular teeth 21 of such form that when the key is in locking position, it is possible to turn the locking collars, that is to say the spaces between the teeth 21 accommodates the annular teeth 16 of the collars 15 so that the latter may be turned, it being apparent that when the key is thus advanced and the teeth of the said collars occupy the spaces between the teeth of the key, the latter cannot be moved longitudinally, but that when the said collars are all set with their cross channels 17 in register with the keyway 5, as shown in Fig. 2, it is possible to reciprocate or operate the key, it being noticed in this connection that the socket 14 of collar 12 accommodates the undermost tooth 21, when the key is withdrawn or unlocked, this being the position it occupies when the car is in use, and in this connection it will be apparent that when the locking collars have been adjusted to unlocking position, the spring 11 will effect the automatic repression or withdrawal of the locking key, though the operator may accomplish the same result by pressing downward on handle 20. The spring has one independent function however in that it will guard against any chance of the key working upward to locking position when the car is in use.

To enable the person in control of the car to unlock the steering wheel, the collar 8 will preferably be provided with an indicating projection 22 in fixed relation with the keyway, and each locking collar is provided externally with a plurality of different characters 23, one character of each locking collar being so disposed with reference to the cross channel 17, that when the particular combination of characters of the three locking collars are vertically alined with the projection 22, the cross channels of said collars shall register with the keyway. The instant this adjustment is effected the spring will unlock the key as hereinbefore explained, or it may be unlocked by hand. In order that the combination may be worked by the sense of touch, the characters 23 project beyond the surface of the collars, and in order that the combination may be changed when desired, the characters 23 are preferably formed on the ends of plugs 24 cemented or otherwise fastened in the collars so that they cannot be readily withdrawn therefrom.

With a lock of the character described, it is apparent that if the driver intends to leave his car for a very short time, he can lock it by the manipulation of a single locking collar so that he can quickly unlock it when he returns. Ordinarily this will be a safe method as an unauthorized person would not know which collar requires readjustment to effect the unlocking operation, and if he turns the wrong collar he will more securely lock the steering post mechanism. If the person in control expects to leave the car for any considerable time it will of course be safer to spin all of the collars.

In locking the car it is of course preferable to turn the front axle, and as a driver will not always approach a curb at the same angle, it is desirable to provide the steering wheel hub with a plurality of locking sockets, any one of which the locking key may enter.

From the above description it will be apparent that we have produced a combination lock mechanism whereby steering control of an automobile is accomplished, and that the mechanism described is efficient and reliable, and it is to be understood that while we have illustrated the preferred construction of the invention, it is obviously susceptible of modification in minor particulars without departing from the spirit and scope of the appended claims.

We claim:

1. The combination in an automobile, of the steering gear post, the steering wheel rigid thereon and provided with a series of downwardly opening sockets, gear post tubing around said post and provided with a longitudinal external groove, a collar secured on said tubing and provided with a keyway passage registering with the said external groove, a second collar rigid on the tubing and provided with an upwardly opening socket, a plurality of collars arranged side by side and journaled on the tubing between said first-named collars and provided with internal annular teeth having cross channels for registration with each other, the said groove, the keyway passage of the first-named collar and the said socket of the other collar, and provided also with external characters in known relation to the respective cross channels and to a fixed point on one of said first-mentioned pair of collars, a locking key slidable in the keyway groove and provided with teeth spaced apart to receive the teeth of said journaled collars and for movement through said cross channels of said collars and in said socket of the second collar; said key also fitting in the keyway passage of the first-named collar and adapted when advanced to fit in a registering socket of the steering wheel, and means for effecting sliding movement of said key.

2. The combination in an autotmobile, of the steering gear post, the steering wheel rigid thereon and provided with a series of downwardly opening sockets, gear post tubing around said post and provided with a longitudinal external groove, a collar secured on said tubing and provided with a keyway passage registering with the said external groove, a second collar rigid on the tubing and provided with an upwardly opening socket and a longitudinal slot, a plurality of collars arranged side by side and journaled on the tubing between said first-named collars and provided with internal annular teeth having cross channels for registration with each other, the said groove, the keyway passage of the first-named collar and the said socket of the other collar, and provided also with external characters in known relation to the respective cross channels and to a fixed point on one of said first-mentioned pair of collars, a locking key slidable in the keyway groove and provided with teeth spaced apart to receive the teeth of said journaled collars and for movement through said cross channels of said collars and in said socket of the second collar; said key also fitting in the keyway passage of the first-named collar and adapted when advanced to fit in a registering socket of the steering wheel, and a handle projecting outward from the key through the said longitudinal slot.

3. The combination in an autotmobile, of the steering post, the steering wheel rigid thereon and provided with a series of downwardly opening sockets, gear post tubing around said post and provided with a longitudinal external groove, a collar secured on said tubing and provided with a keyway passage registering with the said external groove, and a socket opposite from said keyway passage, a second collar rigid on the tubing and provided with an upwardly opening socket, a plurality of collars arranged side by side and journaled on the tubing between said first-named collars and provided with internal annular teeth having cross channels for registration with each other, the said groove, the keyway passage of the first-named collar and the said socket of the other collar, and provided also with external characters in known relation to the respective cross channels and to a fixed point on one of said first mentioned pairs of collars, a locking key slidable in the keyway groove and provided with teeth spaced apart to receive the teeth of said journaled collars and for movement through said cross channels of said collars and in said socket of the second collar; said key also fitting in the keyway passage of the first-named collar and provided with a laterally projecting lug fitting in said socket, a coiled expansion spring fitting in said socket and bearing against said lug of the key to effect unlocking movement of the latter, and means for manually advancing the key against the resistance of said spring.

In testimony whereof, we affix our signatures, in the presence of two witnesses.

JOSEPH H. BAKER.
CHARLIE D. OBERHOLTZER.

Witnesses:
S. M. THORPE,
G. Y. THORPE.